United States Patent [19]
Arias et al.

[11] Patent Number: 5,916,709
[45] Date of Patent: Jun. 29, 1999

[54] BIPOLAR LEAD-ACID BATTERY

[75] Inventors: Jeffrey L. Arias, Downey; Julio A. Aldecoa, Santa Cruz, both of Calif.

[73] Assignee: Bipolar Power Corporation, Whittier, Calif.

[21] Appl. No.: 08/688,425

[22] Filed: Jul. 30, 1996

Related U.S. Application Data

[63] Continuation-in-part of application No. 08/161,970, Dec. 3, 1993, Pat. No. 5,618,641.

[51] Int. Cl.$^6$ ..................................................... H01M 2/22
[52] U.S. Cl. ............................ 429/210; 429/66; 429/204; 29/623.2
[58] Field of Search ............................. 429/210, 66, 204; 29/623.2

[56] References Cited

U.S. PATENT DOCUMENTS

| | | | |
|---|---|---|---|
| 5,162,172 | 11/1992 | Kaun | 429/155 |
| 5,364,713 | 11/1994 | Von Bende et al. | 429/66 |
| 5,618,641 | 4/1997 | Arias | 429/210 |
| 5,729,891 | 3/1998 | Richiardone et al. | 29/623.2 |

OTHER PUBLICATIONS

"Separators for Absorbed Electrolyte Recombinant Batteries," by Wandzy et al., as presented at the 48th IBMA Convention, Oct. 1985, The Battery Man, Jul. 1986.

"Structure of Lead Acid Batteries Adjusted to Fast Charge," by Alzieu et al., The Fifth International Electric Vihicle Symposium, Philadelphia Oct. 2–5, 1978 EVS–5.

"Hovosorb Recombinant Battery Separator Background . . . " by Wandzy of Hollingsworth & Vose Company, East Walpole, MA, Mar. 18, 1987, pp. 1–3.

Primary Examiner—Caridad Everhart
Attorney, Agent, or Firm—Paul J. Fordenbacher

[57] ABSTRACT

An improved bipolar lead-acid battery including a novel "cup" design of a bipolar plate, a resilient sliding rim seal for each battery cell, spring conductors for achieving both high compression and current collection, unique current collecting plates, and a self-sealing venting port on the external container.

20 Claims, 6 Drawing Sheets

BIPOLAR LEAD-ACID BATTERY

This application is a continuation-in-part of U.S. patent application Ser. No. 08/161,970, entitled "Bipolar Battery Construction", filed on Dec. 3, 1993, now U.S. Pat. No. 5,618,641.

FIELD OF THE INVENTION

The present invention relates to the field of rechargeable lead-acid electrical batteries, and in particular, to improvements in the overall battery construction of a sealed bipolar lead-acid battery.

BACKGROUND OF THE INVENTION

Rechargeable batteries are of great importance to many industrial sectors such as the electrical power industry and automotive industry. One class of such batteries is lead-acid based batteries. A conventional lead-acid battery has a series of battery cells with separate monopolar positive and negative electrode grids that are suspended in an acid electrolyte solution. Each electrode usually comprises a grid made of lead or a lead alloy that is covered or filled with positive or negative active materials. Lead or a lead alloy are widely used to take advantage of its resistance to corrosion, low cost, and high gassing over-voltage for both hydrogen and oxygen.

Two adjacent cells are electrically connected through conductors that join the positive electrode grid of a cell to the negative electrode grid of the other cell or vice versa.

The electric current in an electrode grid flows in parallel to the plane of the grid and enters an adjacent cell through the connecting conductors. Batteries with such construction have limits that are related to several factors inherent in their construction.

The excessive weight required for both high-power generation and energy storage impedes many applications. The conventional construction of an electrode grid makes a long electrical path between cells and small electrical cross-section. This forces the electric current to travel along a high resistance path and, therefore, may limit the useful output power from the battery. Such batteries often have limited life, at least partly because of the degradation of the positive active material and the corrosion of the lead material used to construct the positive grids.

Figure 1:
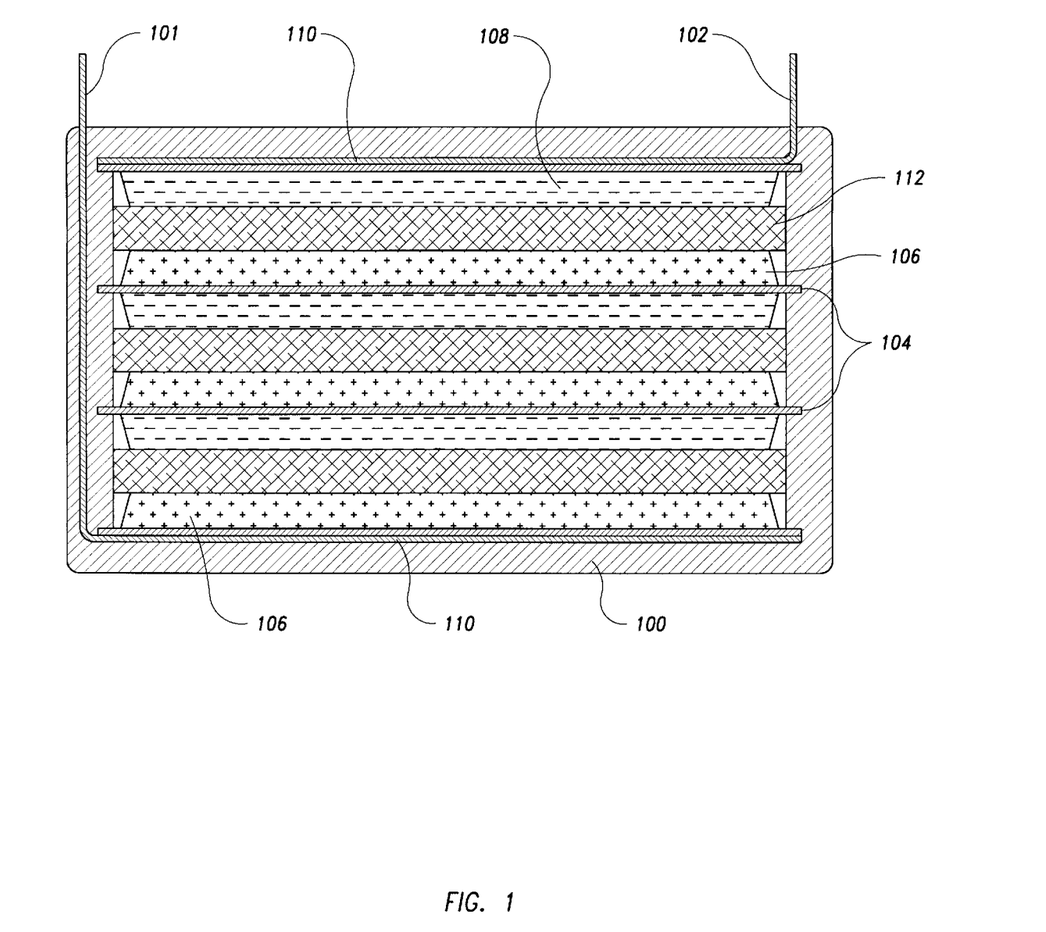
FIG. 1 is a schematic cross-sectional view of a conventional bipolar lead-acid battery.

A bipolar lead-acid battery shown in FIG. 1 uses a different approach. An external case 100 encloses a series of parallel bipolar plates 104. Each bipolar plate 104 is a solid sheet, with its positive side covered by positive active material 106 and its negative side covered by negative active material 108. Bipolar plates 104 partition the battery into a series of cells and also provide electrical contact between the positive and negative electrode materials of adjacent cells. Each cell has a separator 112 which is filled with sulfuric-acid electrolyte. The separator 112 is usually made of glass mat material, in which the electrolyte is absorbed. Two end plates 110 are connected to the positive terminal 101 and the negative terminal 102.

One distinct advantage of such a bipolar battery is that the direction of the electric current is perpendicular to the bipolar battery plates 104. The cross-section of the current flow is, therefore, entire bipolar plate 104. This cross-section is usually much larger than the cross section of the grids of conventional lead-acid batteries. In addition, the electrical path in such a bipolar battery is significantly reduced because of the thin bipolar battery plates. As a result, the intra-cell resistance is minimized and a relatively low overall resistance is achieved with a typical value of approximately one-half to one-fifth of that in a conventional monopolar battery. This facilitates higher power battery sources to become possible.

However, there have been some critical technical problems that have limited the practicality of bipolar batteries. For example, unlike grids of a monopolar battery, the bipolar plates 104 must simultaneously withstand both the positive and negative electrochemical reactions: oxidation and reduction. One major technical challenge in developing a high-power bipolar lead-acid battery has been the construction of a bipolar plate that is light-weight, but that does not achieve the reduced weight by adding more cost or by compromising power (i.e., electrical resistance) or useful lifetime. Various designs on the bipolar plate have been proposed, such as composite bipolar plates described in U.S. Pat. No. 4,658,499 and U.S. Pat. No. 4,507,372. A major improvement in bipolar battery plate construction is disclosed in U.S. patent application Ser. No. 08/096,118, entitled "Battery Plates with Lightweight Cores". The present invention can utilize either a conventional lead/lead alloy bipolar plate or a lightweight bipolar plate that has a long lifetime, high resistance to acidic erosion and oxidation, and reduced manufacturing cost.

Parallel to the progress in bipolar plate technology, the overall construction of a bipolar battery has also been continuously improved. However, some technical problems still remain unsolved in bipolar battery construction.

One technical problem is the electrolyte leakage between battery cells in prior bipolar lead-acid batteries. This leakage of electrolyte can cause an electrical short circuit between the positive active materials and negative active materials of adjacent cells. This leakage may cause a leakage current which can self-discharge the battery cells.

The performance of a bipolar battery is also reduced by the non-uniform separator pressure associated with the rigid plastic seals used in prior battery construction. These seals provide a gas-tight seal between each cell to prevent escape of water vapor and gas, leakage of electrolyte liquid, and entrance of $O_2$ gas, which may discharge the negative plate. The seals also maintain a specific spacing between bipolar plates. Such gas-tight sealing on every cell is difficult to achieve in production and is also problematic to maintain during the lifetime of a battery due to inevitable changes in the dimension of active materials and separators. Also, each cell has typically been individually sealed with a dedicated venting device implemented in every cell. This is not only cumbersome but also complicates the manufacturing operation. Moreover, maintaining a high clamping pressure on the separator is advantageous to battery performance as explained herein. Rigid seals which have been used for this purpose have limited the clamping pressure that can be applied to the separator.

The inventors of the present invention have found that optimal battery performance is achieved by maintaining a high uniform, separator pressure of optimum value. A high uniform pressure on the positive active material is important. The life of this electrode apparently increases when particle-to-particle contact in the positive active material is well maintained and the amount of this pressure changes over time. Various techniques based on material expansion have been developed to increase and maintain the pressure on the positive active material in other types of lead-acid batteries. Examples of such efforts include the use of tubular positive plates to confine the positive active material and the use of various clamping mechanisms to confine material expansion.

In recognition of these and other limitations in the prior art, the present specification describes an improved bipolar lead-acid battery. More specifically, the present invention describes a "cup" design in bipolar plates, a novel lip or rim type seal for individual battery cells, spring conductors used both for maintaining pressure and providing electrical conduction, simplified current collecting plates, a single battery-venting device, and several other new features. The present invention defines additional elements beyond those described in U.S. patent application Ser. No. 08/161,970, "Bipolar Battery Construction", which become apparent in view of the detailed description of a preferred embodiment herein.

The inventors of this invention recognized the importance of the sealing means of a bipolar battery in preventing cells from self-discharging by increasing the path length between two adjacent cells without significantly increasing the physical dimensions of the battery, in minimizing the leakage current should the electrolyte leak, and in maintaining a gas-tight seal in the battery cell stack. The inventors recognized the desirability of implementing a venting function in the sealing means so that a internal positive pressure can be released in case of excess gassing.

The inventors recognized that the integration of a uniform and high compression force on battery separators by a spring-loaded clamping device can increase lead-acid battery life, and increase the power of the battery stack by maintaining optimal pressure between the bipolar plates in each bipolar cell.

The inventors further recognized, importantly, that the end plates in a bipolar battery can be constructed in a similar way to the bipolar plates, to reduce the manufacturing cost and process. The current collection can be accomplished by using the spring-loaded clamping device to simplify the battery construction.

Automotive and electrical power industries have been making continuous effort in high-power batteries such as bipolar batteries. The inventors of the present invention recognized the commercial need for a practical bipolar battery technology and propose significant improvements in several important aspects of the bipolar battery construction including long lifetime, simplified manufacturing, and reduced manufacturing cost. Implementation of the present invention makes it possible to use bipolar battery technology in battery-powered electrical vehicles and other high-power storage applications.

BRIEF DESCRIPTION OF THE DRAWINGS

These and other advantages of the present invention will now be described in detail with reference to the accompanying drawings, in which.

DETAILED DESCRIPTION OF THE PREFERRED EMBODIMENT

The present invention contributes to both the design of a bipolar plate and the overall construction of a bipolar lead-acid battery. More specifically, the present invention discloses significant improvements over the construction of a bipolar battery described in U.S. patent application Ser. No. 08/161,970 filed by one of the present inventors.

Figure 2:
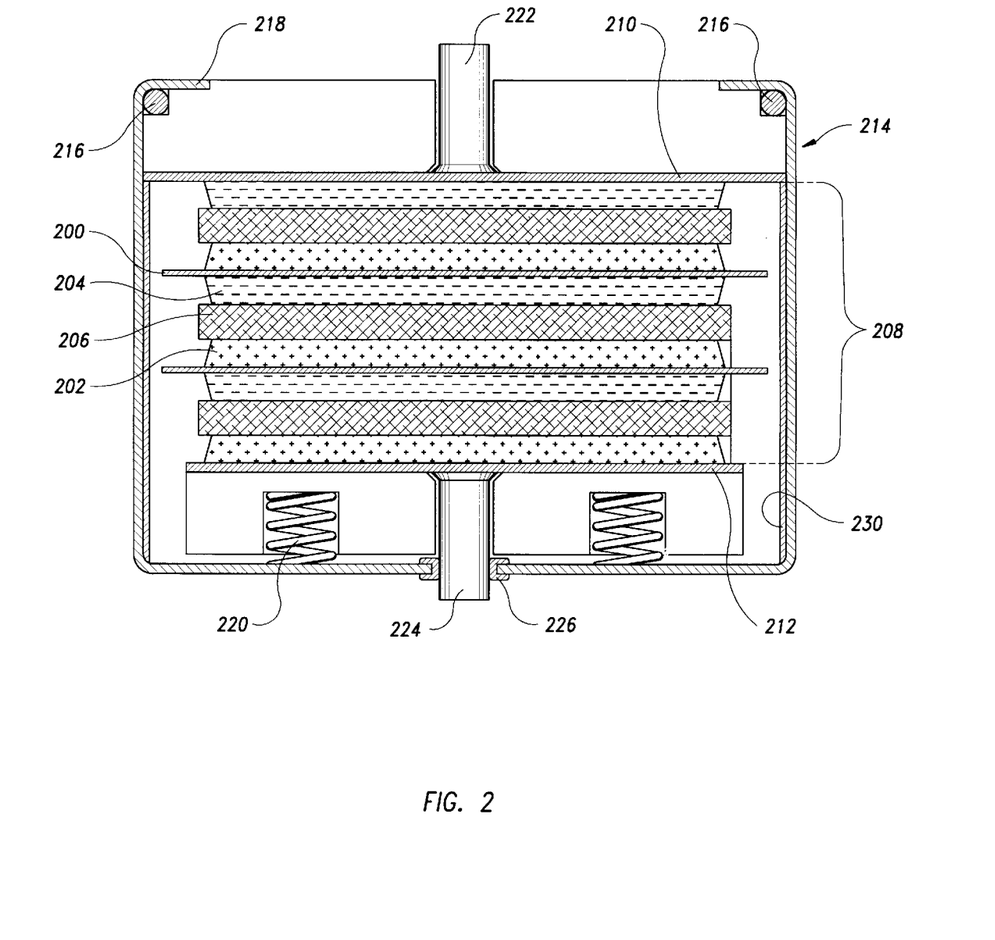
FIG. 2 shows a preferred embodiment of a bipolar battery described in U.S. patent application Ser. No. 08/161,970, filed by the present inventors.

FIG. 2 shows a preferred embodiment of a bipolar battery described in U.S. patent application Ser. No. 08/161,970. A bipolar plate 200 is covered with positive active material (PAM) layer 202 and negative active material (NAM) layer 204 on opposite sides thereof. One battery stack assembly 208 is shown in FIG. 2. A series of battery cells are formed by the bipolar plates 200. Only three cells are illustrated in FIG. 2. A battery separator 206, usually made of glass mat materials that absorb electrolyte liquid, separates the NAM and PAM within an individual cell. The addition of electrolyte is accomplished by wetting each separator 206 with electrolyte and inserting the separator 206 between the PAM 202 and the NAM 204 in the assembling process.

The battery stack assembly 208 is bounded by a first end plate current collector 210 and a second end plate current collector 212. The battery stack assembly 208 is enclosed in a sealed container assembly 214. The assembly 214 includes a first case seal 216 under a case flange 218 which is crimped over the first end plate current collector 210. Alternatively, the case flange 218 can be fastened to the first end plate 210 with fasteners, or can be both crimped and fastened. The second end plate current collector 212 bears against a plurality of springs 220 which exert compressive forces to the battery stack assembly 208.

The container assembly 214 also includes a second case seal 226 near the end plate current collector 212. Terminals 222 and 224 extend outside the battery container assembly 214. An alternative method to conduct the electrical current from the end plate 212 is via a wire or flexible conductor to connect the end plate 212 to a fixed terminal mounted on the container assembly 214. An electrical insulation material layer 230 avoids electrical shorts within the battery if the case is conductive.

The springs 220 apply an appropriate amount of compressive force to the end plate 212. This force, in turn, subsequently generates a substantially uniform and constant high compression force on the battery stack assembly 208 and hence the separators 206 therein. Each separator 206 is placed under a desired compression loading (e.g., on the order of 5–15 pounds per square inch). Importantly, dimensional changes in the PAM layers 202 and NAM layers 204 during the initial formation charge, or subsequent relaxation of the separators 206, is automatically compensated by the constant loading of the springs 220.

This results in a uniform, constant, high separator compression including substantially increased battery life, improved reliability, and significantly increased output power. The mechanical arrangement for applying the spring force does not significantly increase the size or weight of the bipolar battery in FIG. 2. Other techniques for using springs are also possible as disclosed in U.S. patent application Ser. No. 08/161,970.

FIG. 2 shows that gases are allowed to circulate freely and to recombine into water within the sealed, gas-tight container assembly 214. This minimizes the loss of electrolyte from the battery. However, leaking electrolyte liquid from the separators 206 should be confined in order to prevent leakage current between adjacent battery cells within a stack and hence self-discharging. The electrolyte absorbed in the separators 206 can leak out or "creep" out due to capillary action through microscopic crevices and grooves along the surface of bipolar plates 200 or corrosion products on the surface thereof.

Figure 3:
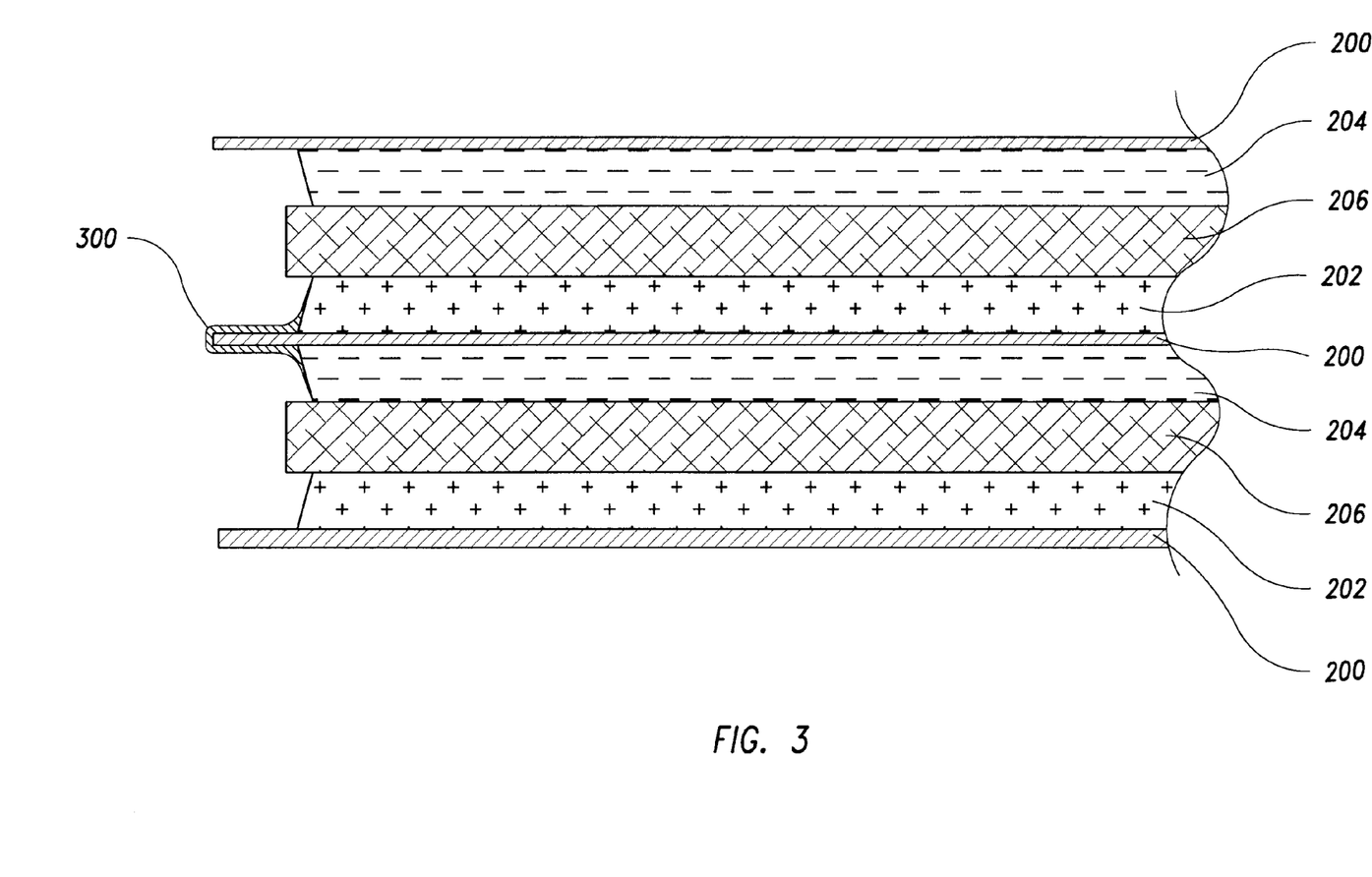
FIG. 3 illustrates "creeping" of excess electrolyte from the cell separator in unsealed battery cells.
Figure 4A:
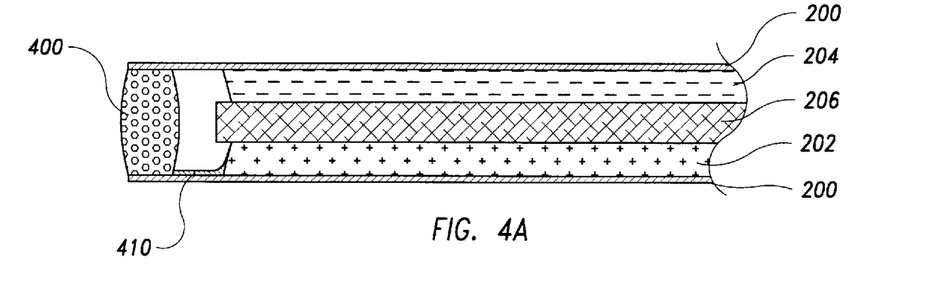
FIG. 4 depict examples in implementing confinement of excess electrolyte disclosed in U.S. patent application Ser. No. 08/161,970, filed by the present inventors.
Figure 4B:
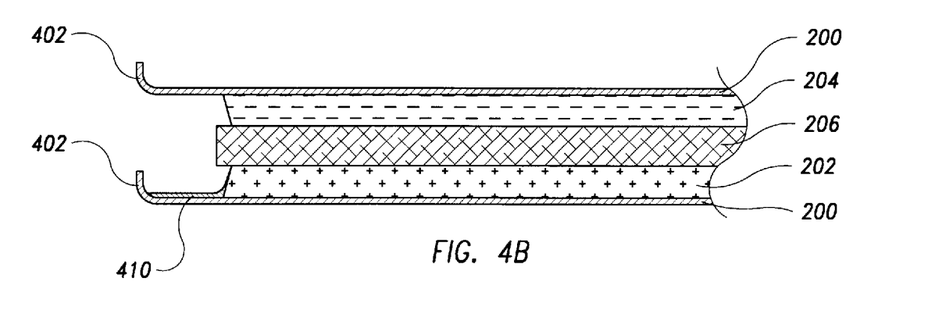
Figure 4C:
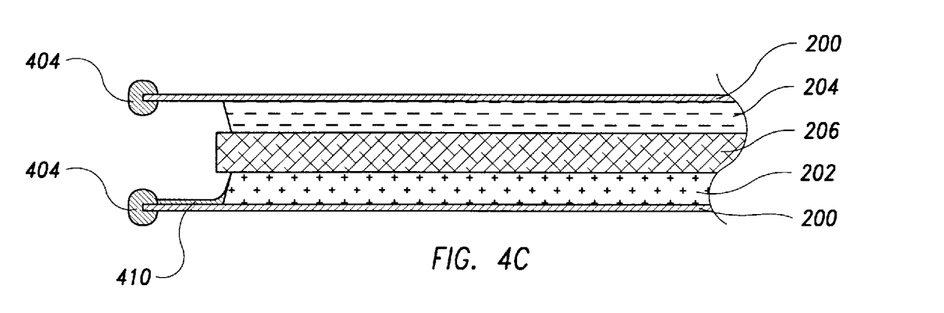
Figure 4D:
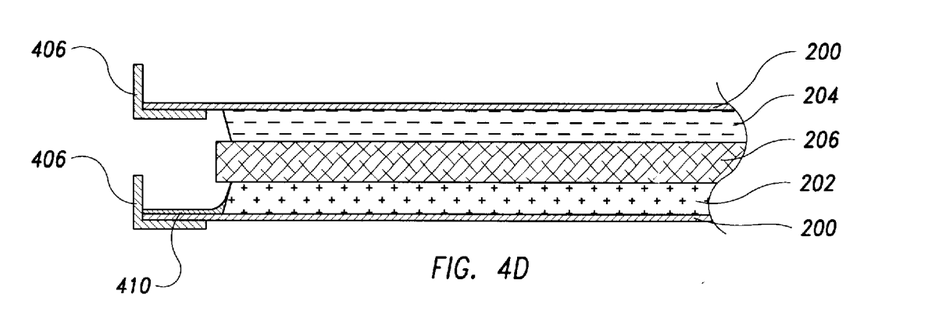

FIG. 3 depicts a bipolar cell that does not have an inhibitor to reduce or eliminate electrolyte "creep".

Electrolyte 300 bridges across adjacent bipolar cells on the bipolar plate 200. The bridge causes a leakage current to flow between the PAM 202 and NAM 204. If excessive, this bridge will cause an unacceptable rate of self-discharge of the unsealed bipolar cells. A longer creep path provides a slower self-discharge rate. However, the long creep path is formed by, for example, a wide plate edge. This occupies excessive volume and makes the resultant packaging relatively inefficient.

U.S. patent application Ser. No. 08/161,970 filed by one of the present inventors proposes a number of techniques to obviate the problem of electrolyte "creep" without having excessively wide plate edges or the disadvantages present in use of conventional, rigid edge seals as discussed thereof. One method is to apply a layer of liquid-repellant or hydrophobic material (e.g., wax, Teflon™, polyethylene, etc. or tantalum, zirconium, etc.) when used with composite plates on the bipolar plates 200 so that the electrolyte forms beads which roll off the surface. Another method is to form inhibiting devices on the peripheral edges of the bipolar plates 200 to confine the excess electrolyte from bridging between two neighboring cells.

FIG. 4 shows some examples of electrolyte inhibitors. 400 is a flexible hydrophobic sponge that presents minimal appreciable resistance to the compression loads on the separator 206. 402 indicates an upturned peripheral edge on the bipolar plate 200 to contain any excess electrolyte 410 and is a precursor to the present design. 404 is a hydrophobic bead affixed to the peripheral edge on the bipolar plate. 406 denotes a rim that is either affixed with adhesive or snapped onto the peripheral edge of the bipolar plate 200 and is another precursor of the present design.

The inventors have discovered a number of improvements that further advance the bipolar battery construction described in U.S. patent application Ser. No. 08/161,970, including a "cup" design of a bipolar plate, a novel lip or rim type seal for individual cells, spring conductors for achieving both high compression and current collection, unique current collecting plates, and several other new features.

Figure 5:
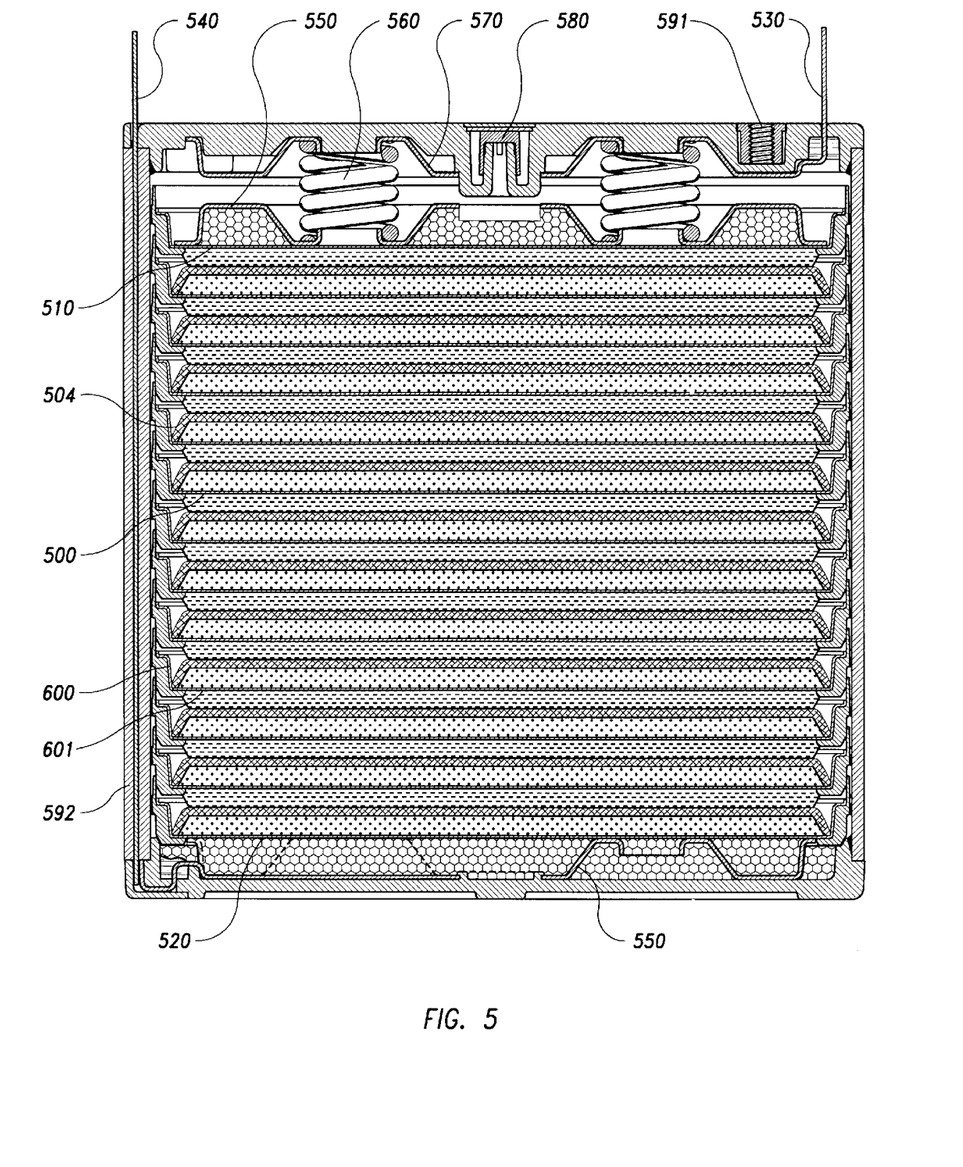
FIG. 5 is a preferred embodiment of the present invention, showing the construction of a bipolar battery.

FIG. 5 shows the construction of the preferred embodiment of a bipolar battery in the present invention. This embodiment takes advantage of an internal cup-like stacking of cells.

Figure 6:
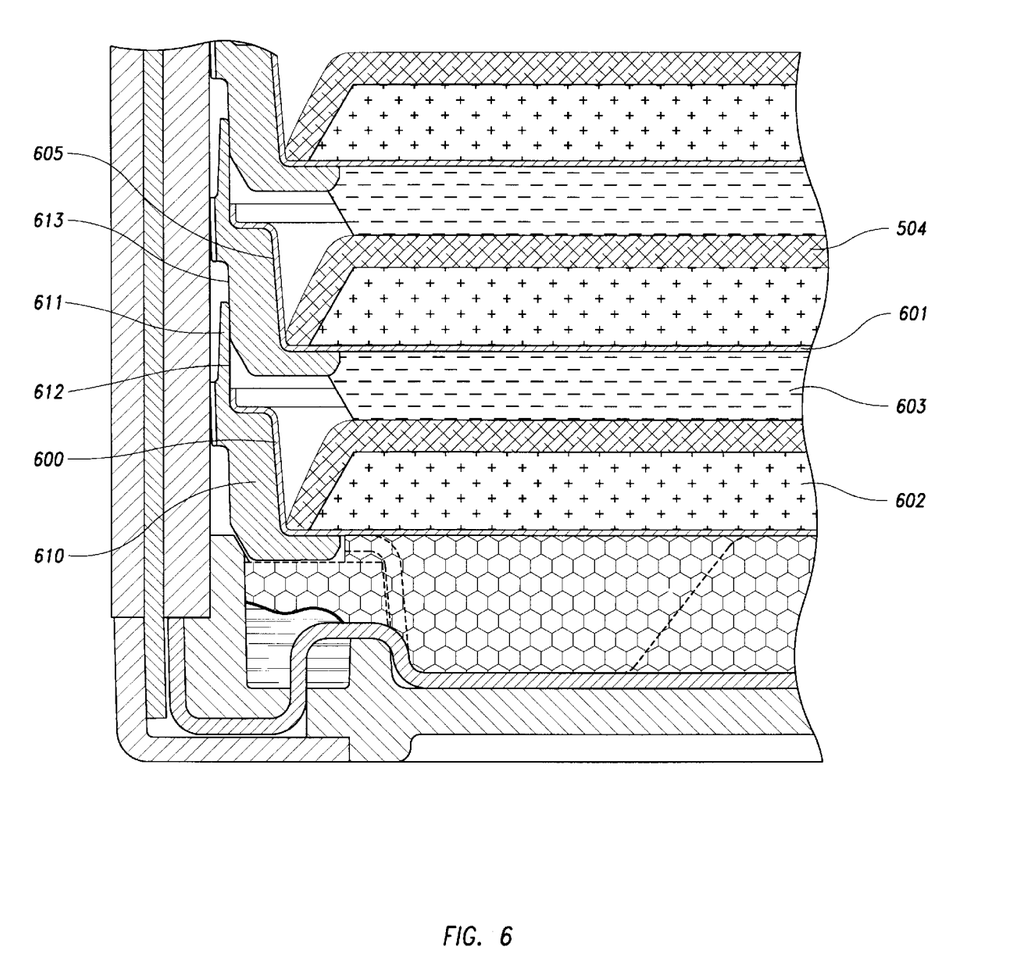
FIG. 6 is a detailed illustration of a cup bipolar plate of the present invention, showing a peripheral edge-compression sealing joint.

A bipolar plate 500 has a flat solid sheet in the central region 601 and a "cup" structure 600 on the peripheral edge thereof. The cup structure is slightly inclined relative to the vertical. Each element's external surface stacks against the internal surface of another element.

The bipolar plates 500 divide the interior of the battery into a plurality of cells and provide electrical contact between two adjacent cells. Each battery cell has a separator 504 that is made of electrolyte-absorbing material such as glass mat material. Sulfuric-acid electrolyte is added by wetting the separator 504 during assembling process. Two end plates 510 and 520 that have the same construction as a bipolar plate 500, except that they have only positive or negative material applied, form ends of the battery interior to provide electrical connections to a positive terminal 540 and a negative terminal 530, respectively. A conducting plate 550 serves as the current collector plate at respective ends of the battery interior.

A spring conductor 560 connects the current collector plates 550 to a current transfer device 570 which is connected to the exterior negative terminal 530. The spring conductor 560 and the current transfer device 570 are made of conducting metallic materials including stainless steel and copper. A pressure-releasing vent 580 is built in the nonmovable closing plate cover 590 of a external case 592.

The external case 592 functions as a conventional battery case to confine gases and liquids therein. The inner surfaces of the case also resists the spring force exerted by the spring conductors 560. An additional feature of the case 592 is its self-resealing vent 580. The vent 580 maintains an interior pressure within the battery for efficient power generation. It further releases excess gas pressure for safety purposes should that pressure exceed a safe limit (e.g., 10–15 psi). The vent reseals if the gas pressure within the battery is below the safety limit. For convenience of operation, two threaded inserts 591 are built in the closing plate cover 590. Each threaded insert 591 is adjacent to a terminal 530 or terminal 540. The bipolar battery can be connected to other electrical units by bending terminals 530 and 540 over their respective threaded insert and attaching conductor wires and bended terminals with threaded fasteners.

A unique feature of the present invention is its use of the current collector plates 550 to eliminate the need for the specially constructed end plates in prior bipolar battery designs in which the end plates are pasted plates with different construction from the bipolar plates. In the present invention, the end plates 510 and 520 are identical in structure to a standard bipolar plate 500, but have only one side being pasted with active materials with the other unpasted side to collect electric current. This significantly simplifies the manufacturing process of the bipolar battery. The current collector plate 550 contacts the exposed side (i.e., unpasted side) of the end plate 510 or 520 to collect the current. The current is then transferred to the positive terminal 530 via spring conductors 560 and the current transfer device 570. The electrical contact between the current collector plate 550 and the bipolar plate 500 can be enhanced with electrically conducting adhesive materials such as conducting epoxy and soldering.

This embodiment uses bipolar plates 500 with a novel "cup" design. FIG. 6 illustrates more detail structure of the "cup" bipolar plate 500 by showing a portion of the bipolar battery in the present invention. A bipolar plate 500, has an upturned cup shape edge 600 at its peripheral edge area. The bipolar plate 500 of the present invention has a central flat portion 601 and an edge "cup" portion, the cup edge 600, in the peripheral area thereof. A sliding rim seal 610 is attached to the cup edge 600. The inner surface 612 of each rim seal seals against the outer surface 613 of an adjacent rim seal. This forms a seal with another adjacent rim seal.

This bipolar plate 500 with the new cup design is constructed with a lead core layer. A number of other, more corrosion-resistant materials can be used to construct the bipolar plate 500, such as titanium, aluminum, steel or steel alloys. One or a plurality of protective layers are applied to the positive side of the bipolar plate 500. The protective layers are fabricated from any materials having sufficient resistance to corrosion caused by the acid and electrical-potential on the positive side of the bipolar plate 500, sufficient electrical conductivity, being thermodynamically stable, lightweight, and having good adhesion to the bipolar plate 500. For example, stannic oxide can be used for this purpose. Protective layers are also applied to the negative side of the bipolar plates 500. The protective layers comprise conducting materials that are able to withstand sulfuric acid in the electrical potential, approximately −0.3 to −0.4 V versus $H_2$, present on the negative side. Many metals and graphite could be used to protect the negative side of bipolar plates 500, but lead is preferred for this purpose because it is a simple, inexpensive, and effective negative protection material. Lead is thermodynamically stable on the negative side of the bipolar plates 500 and a lead protective layer can be made very thin.

This "cup" design in bipolar plates provides a number of distinctive advantages, including:

(1) the use of cup edge 600 increases the length of the path along which the electrolyte must creep in order to effect a short circuit between the two neighboring cells, but without significantly increasing the physical dimensions of the battery;

(2) the cup edge 600 provides an additional plate area to effect a sealed joint 605 for attachment means such as adhesive bonding, welding, or molding the sliding rim seal 610 onto the plate;

(3) the cup edge 600 also provide additional plate area to provide a hydrophobic coating for further confining any excessive electrolyte liquid;

(4) the long path between positive and negative materials 602 and 603, that are applied on the opposite sides of the same bipolar plate 500, will minimize the leakage current should the electrolyte breach the sealed joint 605 and/or hydrophobic coating at the cup edge 600; and (5) the cup edge 600 provides an area for the accumulation of excess electrolyte without flooding the seal area near the joint 605.

Both the positive active material 602 and the negative material 603 are preferably applied to only the central flat portion 601 of the bipolar plate 500 in the present invention. The separator 504 is also sized to be within the central flat portion 601. This allows some space in the peripheral area of the bipolar plate 500 to contain the excessive electrolyte liquid.

The sliding rim seal 610 attached to the cup edge 600 is preferably made of plastic materials, e.g., high-impact polystyrene, polypropylene, etc. In the preferred embodiment as in FIG. 6, the sliding rim seal 610 has a sliding lip 611 extending out of the cup edge 600. One surface of the sliding lip 611 presses against another rim seal attached to an adjacent bipolar plate to form a seal. The resilient force of the sliding lip 611 makes the seal air-tight if the pressure within the cell is below a threshold value (e.g., 3 psi). If the force on the seal from the cell pressure exceeds the resilient force of the lip 611, the seal is forced open to release the excessive gas within the cell. This allows venting internal positive cell pressure (e.g., during excess gassing) into the interior of the battery case 592 while maintaining a lower pressure within the battery cell than that in the case interior.

In addition, such a seal provides a method of allowing the battery stack to compress (e.g., during paste or separator shrinkage) while maintaining a seal by the resilient force of the lip 611. The lip 611 of the sliding rim seal 610 must slide sufficiently freely to allow movement under spring load but still maintain sealing. Importantly, the sliding rim seal 610 enables each cell in a battery to be individually sealed and thereby prevents the circulation of gas (oxygen) between cells. This is important for maintaining cell state-of-charge balance and a constant electrolyte concentration in each cell to ensure optimal performance.

Another aspect of the sliding rim seal 610 is that the sealing does not have to be perfect. According to the present invention, the preferred sealing pressure inside each battery cell is between 0.5–2.0 psi.

Furthermore, the sliding rim seal 610 under normal operating conditions prevents the breaching of electrolyte between cells and thereby self-discharging. Excess electrolyte from the separator 504 is confined within each cell by the sliding rim seal 610 along with the cup shape 600 at the peripheral edge area of the bipolar plate 500. The sealing force of the seal 610 is adjusted by the fit between sliding portions, the design of the lip 610, the selection of materials, and/or the use of a grease in the joint at the lip 611, or in any combination thereof.

This "cup" design of bipolar plates 500 as well as the sliding rim seal 610 are intended for cells with some minimum thickness (e.g., 0.19") and is more advantageous for thicker cells (e.g., thicker than 0.30"). Several proprietary pastes allow for very thick electrodes (i.e., pasted plates) while maintaining high material utilization efficiency and thus the cup/lip design is practical.

As described above, the present invention significantly improves the lead-acid bipolar battery described in U.S. patent application Ser. No. 08/161,970 in terms of the bipolar plate and the construction of the battery. Importantly, the present invention presents a number of advantages over the existing lead-acid bipolar batteries. It is clear that the invention surmounts the manufacturing impediments and sealing difficulties by applying unique structures and techniques. Implementation of the present invention provides a new generation of mobile power supplies that will revolutionize many industrial sectors such as transportation and energy. Highly efficient storage batteries based on the present invention will enable many new battery-powered products to become practical such as electric vehicles. Furthermore, the present invention will also enable electric utilities and manufacturers of backup power systems with a more compact high-power battery.

Although the present invention has been described in detail with certain degree of particularity with respect to the preferred embodiment and the accompanying drawings, those ordinarily skilled in the art to which this invention pertains will appreciate that various modifications and enhancements may be made without departing from the spirit and scope of the following claims, in which:

What is claimed is:

1. A sealed battery apparatus comprising:

a housing, including an external case, a first external terminal, and a second external terminal;

a plurality of bipolar plates, located in said housing and stacked relative to one another, said bipolar plates forming battery cells, said bipolar plates physically stacked together and bounded at a first end by a first end collector and at a second end by a second end collector; said first end collector being connected to said first external terminal and said second end collector being connected to said second external terminal;

each of said bipolar plates including an electrical, conducting core plate with a first positive side having a positive active material and a second negative side having a negative active material;

each of said bipolar plates including an edge portion, extending in a direction that is substantially perpendicular to a direction of extending of said bipolar plates, and is inclined relative to said perpendicular, so that said stacked bipolar plates have an outer stacking surface of a first bipolar plate stacked against an inner surface of a second adjacent bipolar plate, forming a sliding seal for a battery cell that is formed by said first bipolar plate and said second bipolar plate; and a compression element, biasing said stack of bipolar plates relative to said housing.

2. An apparatus as in claim 1, wherein said edge portion further including a lip structure made of an electrically insulating material; a first lip structure in said first bipolar plate forming said outer stacking surface; a second lip structure in said second bipolar plate forming said inner surface; and said sliding seal sealing said battery cell by a resilient force exerted from stacking said first lip structure against said second lip structure.

3. An apparatus as in claim 2 wherein said lip structure is made of a plastic material.

4. An apparatus as in claim 2 wherein said lip structure is attached to said edge portion with adhesion, or welding, or molding.

5. An apparatus as in claim 2, wherein said resilient force for sealing said battery cell is adjusted by choosing a particular material for said electrically insulating material.

6. An apparatus as in claim 2, wherein said resilient force for sealing said battery cell is adjusted by changing geometric shape of said lip structure.

7. An apparatus as in claim 2, wherein said resilient force for sealing said battery cell is adjusted by applying a lubricant between said outer stacking surface and said inner surface.

8. An apparatus as in claim 2, wherein said sliding seal maintains a gas pressure within said battery cell in a range from zero to 10 pounds per square inch, but preferably in a range from 0.5 pounds per square inch to 2 pounds per square inch.

9. An apparatus as in claim 1 wherein said edge portion is coated with liquid-repellant materials.

10. An apparatus as in claim 2, wherein each of said bipolar plates further comprises:

a central flat portion having a first flat surface on said first positive side and a second flat surface on said second negative side oppositely facing said first positive side;

said edge portion having a first curved surface and a second curved surface that is curved in the same direction as said first curved surface; said first curved surface being connected to said first flat surface of said central flat portion at a first level above said first flat surface, said second curved surface being connected to said second flat surface of said central flat portion at a second level above said first flat surface; and said first curved surface merging with said second curved surface at an end of said edge portion.

11. An apparatus as in claim 1 wherein said compression element is made of an electrical conducting material, further operating to apply and maintain a uniform and predetermined pressure between said first end collector and said second end collector and thereby on each of said bipolar plates; said compression element being disposed internally inside said housing and further providing a first electrical conduit in said pressurized battery apparatus.

12. An apparatus as in claim 11, wherein said compression element is a conducting spring.

13. An apparatus as in claim 12, wherein said conducting spring is made of steel or copper.

14. An apparatus as in claim 1 further including a self-resealing venting element built in said housing, operating to release excess gas pressure within said housing at a predetermined threshold pressure.

15. An apparatus as in claim 1, wherein said external case further including two insert threaded holes, each located in a vicinity of said first external terminal and said second external terminal, respectively, operating to facilitate electrical connection of said apparatus to other devices.

16. An apparatus as in claim 1, wherein said first end collector and said second collector are substantially identical to each other in construction and are substantially identical to said bipolar plates in construction.

17. An apparatus as in claim 10, further including a separator in said battery cell being sized to be approximately equal to said central flat portion of said bipolar plates; said separator operating to separate said first bipolar plate from said second bipolar plate and to provide an electrolyte conduit therebetween.

18. An apparatus as in claim 1, further including:

a first conducting element, disposed within said external case to connect said first end collector and said first external terminal and thereby to provide an electrical conduit therebetween; and a second conducting element, disposed within said external case to connect said second end collector and said second external terminal and thereby to provide an electrical conduit therebetween.

19. An apparatus as in claim 2 wherein said lip structure is made of an elastomeric material.

20. An apparatus as in claim 2, wherein said edge portion consists of one or more curved surfaces and one or more flat surfaces.

* * * * *